(12) United States Patent
Ravich et al.

(10) Patent No.: US 10,983,930 B1
(45) Date of Patent: Apr. 20, 2021

(54) EFFICIENT NON-TRANSPARENT BRIDGE (NTB) BASED DATA TRANSPORT

(71) Applicant: EMC IP Holding Company LLC, Hopkinton, MA (US)

(72) Inventors: Leonid Ravich, Yatzitz (IL); Eldad Zinger, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/742,086

(22) Filed: Jan. 14, 2020

(51) Int. Cl.
*G06F 13/14* (2006.01)
*G06F 13/16* (2006.01)
*G06F 11/10* (2006.01)
*G06F 13/42* (2006.01)

(52) U.S. Cl.
CPC ...... *G06F 13/1668* (2013.01); *G06F 11/1004* (2013.01); *G06F 13/4282* (2013.01); *G06F 2213/0026* (2013.01)

(58) Field of Classification Search
CPC .............................. G06F 13/1668; G06F 13/00
USPC ............................................... 710/5; 719/330
See application file for complete search history.

(56) References Cited

U.S. PATENT DOCUMENTS

| | | | |
|---|---|---|---|
| 5,682,534 A * | 10/1997 | Kapoor | G06F 9/547 709/203 |
| 5,687,373 A * | 11/1997 | Holmes | H04L 29/06 719/328 |
| 6,697,878 B1 * | 2/2004 | Imai | G06F 9/547 709/201 |
| 6,728,788 B1 * | 4/2004 | Ainsworth | G06F 9/547 719/330 |
| 7,047,536 B1 * | 5/2006 | Duncan | G06F 9/547 709/217 |
| 7,062,594 B1 | 6/2006 | Sardella et al. | |
| 7,089,567 B2 * | 8/2006 | Girardot | G06F 9/547 719/330 |
| 7,779,086 B1 * | 8/2010 | Gammo | H04L 61/1541 709/219 |
| 8,555,297 B1 * | 10/2013 | Gould | G06F 9/547 719/330 |
| 8,725,923 B1 | 5/2014 | Frangioso et al. | |
| 8,850,460 B1 * | 9/2014 | Gould | G06F 9/547 719/330 |
| 9,582,197 B1 | 2/2017 | Shapiro | |
| 10,007,443 B1 | 6/2018 | Rajadnya et al. | |

(Continued)

*Primary Examiner* — Titus Wong
(74) *Attorney, Agent, or Firm* — BainwoodHuang (57) ABSTRACT

Techniques for providing an efficient NTB-based data transport in a highly available storage system. The techniques include performing an ordered transfer of a source data buffer from a primary storage node to a secondary storage node over a PCIe NTB, writing a "transfer ID value" for the ordered transfer over the NTB to a "received transfer ID register" of the secondary storage node, performing a remote procedure call (RPC) to send, over a side channel, the transfer ID value as a "sent transfer ID value" to the secondary storage node, and processing the RPC call to verify the value contained in the received transfer ID register against the sent transfer ID value. Having performed the verification, the secondary storage node determines a successful or unsuccessful status of the ordered transfer, and sends an RPC reply to acknowledge or inform the primary storage node of the successful or unsuccessful status.

20 Claims, 3 Drawing Sheets

(56) References Cited

U.S. PATENT DOCUMENTS

| | | |
|---|---|---|
| 10,229,734 B1 | 3/2019 | Nieuwejaar et al. |
| 10,635,320 B2 | 4/2020 | Zhai et al. |
| 2004/0237092 A1* | 11/2004 | Jairath .................... G06F 9/548 |
| | | 719/315 |
| 2005/0210142 A1* | 9/2005 | de Jong .................. G06F 9/541 |
| | | 709/228 |
| 2007/0016915 A1* | 1/2007 | Mukundan .............. G06F 9/547 |
| | | 719/330 |

* cited by examiner

EFFICIENT NON-TRANSPARENT BRIDGE (NTB) BASED DATA TRANSPORT

BACKGROUND

Highly available storage systems include multiple storage processors (also referred to herein as "storage node(s)") that simultaneously have read/write input/output (IO) access to the same storage objects (e.g., volumes (VOLs), logical units (LUs), file systems). Such storage systems typically include at least two storage nodes for high availability, such as a primary storage node and a secondary storage node. Each storage node can receive storage IO requests (e.g., read IO requests, write IO requests) over a network from multiple host computers. In response to the storage IO requests, the storage nodes can perform storage IO operations (e.g., read/write IO operations) to read/write data blocks, data pages, data files, or any other suitable data elements from/to one or more storage objects. In response to a data transfer request, each storage node can transfer various amounts of storage data and/or other information to the other storage node over a point-to-point connection between the two storage nodes.

SUMMARY

In a highly available storage system, various amounts of storage data and/or other information can be transferred between a primary storage node and a secondary storage node over a Peripheral Component Interconnect Express (PCIe) Non-Transparent Bridge (NTB), which is a point-to-point PCIe bus interconnecting the two storage nodes. Such a PCIe NTB can allow the storage nodes on both sides of the bridge to have independent memory address domains. To transfer storage data and/or other information across the PCIe NTB, each storage node can employ one or more memory address windows, each of which is exposed to the other storage node. Each storage node can write storage data and/or other information to a respective memory address window by performing a PCIe write operation, which is effectively mirrored to a respective memory address window on the other storage node. However, such transfers of data and/or other information across a PCIe NTB between storage nodes in a highly available storage system can be problematic due to the wait time (latency) to process the data transfers. Moreover, because PCIe write operations are posted-write operations, there is a lack of acknowledgment of completion of the data transfers.

Techniques are disclosed herein for providing an efficient NTB-based data transport in a highly available storage system. Such a highly available storage system can include at least a primary storage node, a secondary storage node, and a PCIe NTB interconnecting the primary and secondary storage nodes. The primary and secondary storage nodes can each have a memory address window mapped for use with the PCIe NTB. By initiating an ordered transfer of a source data buffer from the primary storage node to the secondary storage node over the PCIe NTB, writing a unique "transfer ID value" for the ordered transfer over the PCIe NTB to a "received transfer ID register" of the secondary storage node, making a remote procedure call (RPC) (also referred to herein as the "RPC call") to send, over a side channel, the transfer ID value as a "sent transfer ID value" to the secondary storage node, and processing the RPC call to verify the value contained in the received transfer ID register against the sent transfer ID value, the secondary storage node can determine a successful or unsuccessful status of the ordered transfer, and send an RPC reply to acknowledge or inform the primary storage node of the successful or unsuccessful status. Because the primary storage node does not wait for completion of the ordered transfer of the source data buffer to the secondary storage node, latency is reduced.

In certain embodiments, a method of providing an efficient NTB-based data transport in a highly available storage system includes initiating an ordered transfer of a source data buffer over the NTB from a first storage node to a second storage node, and, without waiting for completion of the ordered transfer, writing a transfer identifier (ID) value for the ordered transfer over the NTB from the first storage node to a specified register of the second storage node. The method further includes making a remote procedure call (RPC call) at the first storage node to send, over a side channel, the transfer ID value for the ordered transfer to the second storage node, and processing the RPC call at the second storage node to verify the transfer ID value written to the specified register against the sent transfer ID value, thereby determining a status of the ordered transfer. The method further includes, having determined the status of the ordered transfer, sending an RPC reply over the side channel from the second storage node to acknowledge or inform the primary storage node of the status of the ordered transfer of the source data buffer.

In certain arrangements, the transfer ID value is one of a series of transfer ID values written to the specified register of the second storage node. The method further includes overwriting a transfer ID value previously written to the specified register of the second storage node.

In certain arrangements, the method further includes obtaining the transfer ID value for the ordered transfer by incrementing the transfer ID value previously written to the specified register of the second storage node.

In certain arrangements, the method further includes initiating a first PCIe write operation. The first PCIe write operation has a plurality of parameters including at least a memory address and length of the source data buffer, and a destination memory address.

In certain arrangements, the memory address and length of the source data buffer corresponds to a first NTB memory window in a first memory of the first storage node, and the destination memory address corresponds to a second NTB memory window in a second memory of the second storage node. The method further includes performing the first PCIe write operation by asynchronously transferring the source data buffer over the NTB from the first NTB memory window to the second NTB memory window.

In certain arrangements, the method further includes initiating a second PCIe write operation. The second PCIe write operation has at least one parameter including the transfer ID value.

In certain arrangements, the specified register of the second storage node is mapped to the NTB. The method further includes performing the second PCIe write operation by asynchronously sending the transfer ID value over the NTB to the specified register of the second storage node.

In certain arrangements, the method further includes processing the RPC call after a predefined polling period.

In certain arrangements, the method further includes determining whether the transfer ID value contained in the specified register of the second storage node is less than, greater than, or equal to the sent transfer ID value.

In certain arrangements, the method further includes, if the transfer ID value contained in the specified register of the second storage node is less than the sent transfer ID value, performing one or more of (i) entering a holding mode, and (ii) sending an RPC reply over the side channel directing the first storage node to repeat the ordered transfer.

In certain arrangements, the method further includes, if the transfer ID value contained in the specified register of the second storage node is greater than or equal to the sent transfer ID value, determining that the ordered transfer of the source data buffer has completed.

In certain arrangements, the method further includes sending, over the side channel, an RPC reply to the first storage node to acknowledge completion of the ordered transfer of the source data buffer.

In certain arrangements, the RPC call has at least one parameter including a cyclic redundancy code (CRC) of the source data buffer. The method further includes verifying a CRC of the source data buffer transferred to the second storage node against the CRC of the source data buffer provided as a parameter of the RPC call.

In certain embodiments, a highly available storage system includes a primary storage processor and a secondary storage processor. The primary storage processor is communicably connected over a non-transparent bridge (NTB) to the secondary storage processor. The primary storage processor is configured to (i) initiate an ordered transfer of a source data buffer over the NTB to the secondary storage processor, (ii) without waiting for completion of the ordered transfer, write a transfer identifier (ID) value for the ordered transfer over the NTB to a specified register of the secondary storage processor, and (iii) make a remote procedure call (RPC call) to send, over a side channel, the transfer ID value for the ordered transfer to the secondary storage processor. The secondary storage processor is configured to (i) process the RPC call to verify the transfer ID value written to the specified register against the sent transfer ID value, thereby determining a status of the ordered transfer, and, (ii) having determined the status of the ordered transfer, send an RPC reply, over the side channel, to acknowledge or inform the primary storage processor of the status of the ordered transfer of the source data buffer.

In certain arrangements, the secondary storage processor is further configured to determine whether the transfer ID value contained in the specified register of the secondary storage node is less than, greater than, or equal to the sent transfer ID value.

In certain arrangements, the secondary storage processor is further configured, if the transfer ID value contained in the specified register of the secondary storage node is less than the sent transfer ID value, to perform one or more of (i) entering a holding mode, and (ii) sending an RPC reply over the side channel directing the first storage node to repeat the ordered transfer.

In certain arrangements, the secondary storage processor is further configured, if the transfer ID value contained in the specified register of the secondary storage node is greater than or equal to the sent transfer ID value, to determine that the ordered transfer of the source data buffer has completed.

In certain arrangements, the secondary storage processor is further configured to send, over the side channel, an RPC reply to the first storage node to acknowledge completion of the ordered transfer of the source data buffer.

In certain embodiments, a computer program product includes a set of non-transitory, computer-readable media having instructions that, when executed by processing circuitry of a first storage node and a second storage node communicably connected to one another over a non-transparent bridge (NTB) in a highly available storage system, cause the processing circuitry to perform a method including initiating an ordered transfer of a source data buffer over the NTB from the first storage node to the second storage node, and, without waiting for completion of the ordered transfer, writing a transfer identifier (ID) value for the ordered transfer over the NTB from the first storage node to a specified register of the second storage node. The method further includes making a remote procedure call (RPC call) at the first storage node to send, over a side channel, the transfer ID value for the ordered transfer to the second storage node, and processing the RPC call at the second storage node to verify the transfer ID value written to the specified register against the sent transfer ID value, thereby determining a status of the ordered transfer. The method further includes, having determined the status of the ordered transfer, sending an RPC reply over the side channel from the second storage node to acknowledge or inform the primary storage node of the status of the ordered transfer of the source data buffer.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for providing an efficient non-transparent bridge (NTB) based data transport in a highly available storage system. The disclosed techniques can include initiating an ordered transfer of a source data buffer from a primary storage node to a secondary storage node over a Peripheral Component Interconnect Express (PCIe) NTB, writing a unique "transfer ID value" for the ordered transfer over the PCIe NTB to a "received transfer ID register" of the secondary storage node, making a remote procedure call (RPC call) to send, over a side channel, the transfer ID value as a "sent transfer ID value" to the secondary storage node, and processing the RPC call to verify the value contained in the received transfer ID register against the sent transfer ID value. Having performed the verification, the secondary storage node can determine a successful or unsuccessful status of the ordered transfer, and send an RPC reply to acknowledge or inform the primary storage node of the successful or unsuccessful status. Because the primary storage node does not wait for completion of the ordered transfer of the source data buffer to the secondary storage node, latency is reduced.

Figure 1:
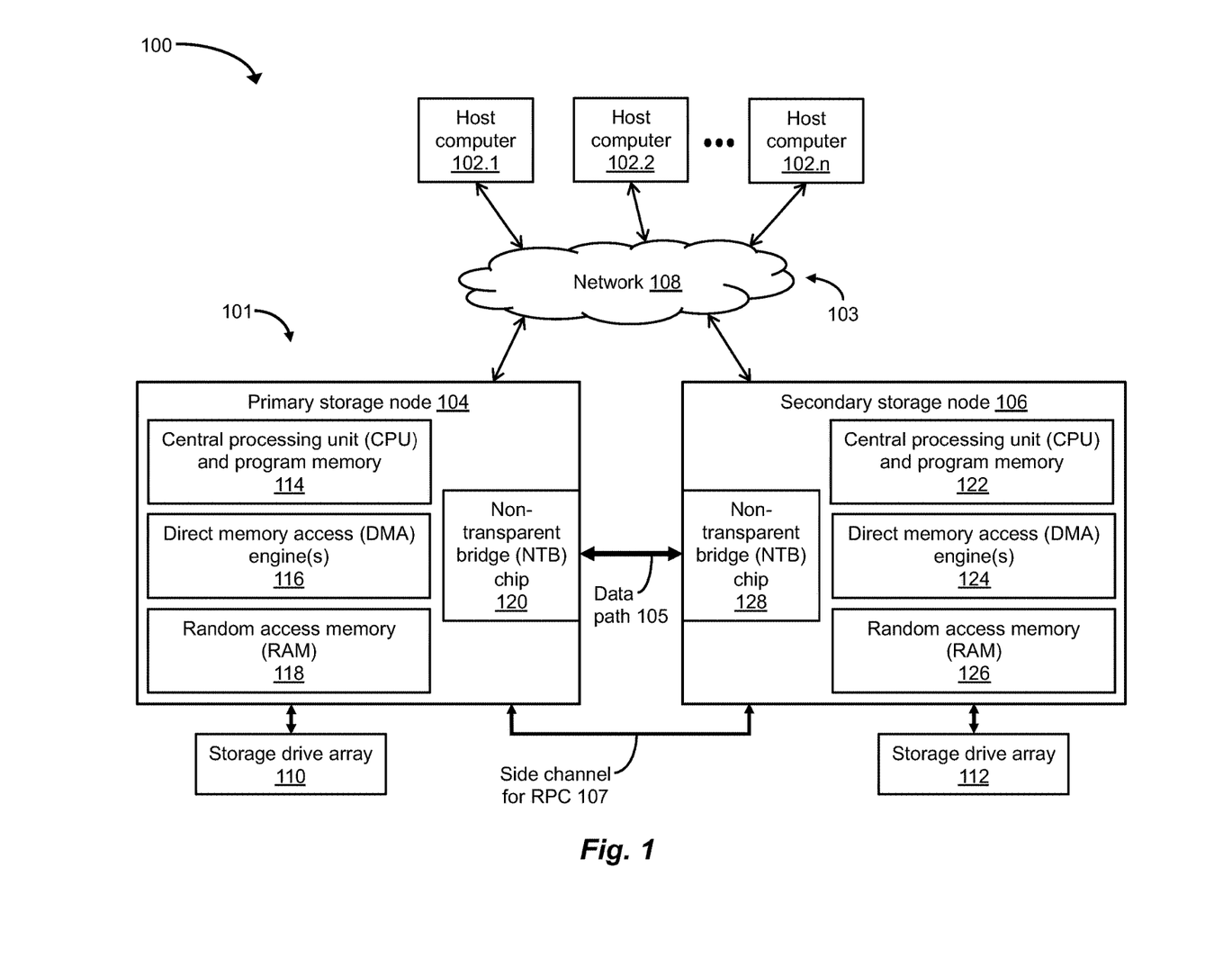
FIG. 1 is a block diagram of an exemplary data storage environment, in which techniques can be practiced for providing an efficient non-transparent bridge (NTB) based data transport in a highly available storage system.

FIG. 1 depicts an illustrative embodiment of an exemplary data storage environment 100, in which techniques can be practiced for providing an efficient NTB-based data transport in a highly available storage system. As shown in FIG. 1, the data storage environment 100 can include a plurality of host computers 102.1, 102.2, . . . , 102.n, a highly available storage system 101, and a communications medium 103 that includes at least one network 108. For example, each of the plurality of host computers 102.1, . . . , 102.n can be configured as a web server computer, a file server computer, an email server computer, an enterprise server computer, and/or any other suitable client/server computer or computerized device. The plurality of host computers 102.1, . . . , 102.n can be configured to provide, over the network 108, storage input/output (IO) requests (e.g., small computer system interface (SCSI) commands, network file system (NFS) commands) to the highly available storage system 101. Such storage IO requests (e.g., write IO requests, read IO requests) can direct data storage processors (storage nodes) to write/read data blocks, data pages, data files, or any other suitable data elements to/from volumes (VOLs), logical units (LUs), file systems, and/or any other suitable storage objects maintained in association with the highly available storage system 101.

The communications medium 103 can be configured to interconnect the plurality of host computers 102.1, . . . , 102.n and multiple storage nodes (e.g., a primary storage node 104, a secondary storage node 106; see FIG. 1) of the highly available storage system 101 to enable them to communicate and exchange data and/or control signaling. As shown in FIG. 1, the communications medium 103 can be illustrated as a "cloud" to represent different communications topologies such as a backbone topology, a hub-and-spoke topology, a loop topology, an irregular topology, and so on, or any suitable combination thereof. As such, the communications medium 103 can include copper-based data communications devices and cabling, fiber optic-based communications devices and cabling, wireless communications devices, and so on, or any suitable combination thereof. Further, the communications medium 103 can be configured to support storage area network (SAN) communications, network attached storage (NAS) communications, local area network (LAN) communications, metropolitan area network (MAN) communications, wide area network (WAN) communications, wireless communications, distributed infrastructure communications, and/or any other suitable communications.

FIG. 1 depicts a detailed view of the highly available storage system 101, which can include at least the primary storage node 104 and the secondary storage node 106. As employed herein, the term "highly available storage system" refers to a data storage system in which multiple data storage nodes simultaneously have read/write IO access to the same storage objects (e.g., volumes (VOLs), logical units (LUs), file systems). For example, the primary storage node 104 (or the secondary storage node 106) can receive storage IO requests from the respective host computers 102.1, . . . , 102.n over the network 108. In response to the storage IO requests, the primary storage node 104 (or the secondary storage node 106) can perform storage IO operations (e.g., read/write IO operations) to read/write data blocks, data pages, data files, or any other suitable data elements from/to one or more storage objects (e.g., volumes (VOLs), logical units (LUs), file systems) stored on a storage drive array 110 (or a storage drive array 112).

In certain implementations, the storage drive array 110 and the storage drive array 112 can be RAID arrays locally attached to IO channels of the primary storage node 104 and the secondary storage node 106, respectively. Alternatively (or in addition), one or more of the storage drive arrays 110, 112 can be implemented as dual-ported drives, which can be shared between the primary storage node 104 and the secondary storage node 106. The storage drive arrays 110, 112 can incorporate storage devices including non-volatile random-access memory (NVRAM) devices, solid-state drives (SSD), hard drives, flash memories, and/or any other suitable storage device(s) for storing storage object data and/or metadata. At least at intervals, the primary storage node 104 (or the secondary storage node 106) can store, update, and/or synchronize data and/or other information to the secondary storage node 106 (or the primary storage node 104). In the event of a failure of the primary storage node 104 or at any other suitable time, the secondary storage node 106 can assume the role and/or duties of the primary storage node 104 with regard to the handling of storage IO requests, providing high availability within the storage system 101.

As shown in FIG. 1, the primary storage node 104 can include a central processing unit (CPU) and program memory 114, one or more direct memory access (DMA) engines 116 (e.g., up to eight (8) DMA engines), a random-access memory (RAM) 118, and a non-transparent bridge (NTB) chip 120. Likewise, the secondary storage node 106 can include a CPU and program memory 122, one or more DMA engines 124 (e.g., up to eight (8) DMA engines), a RAM 126, and an NTB chip 128. The NTB chips 120, 128 can be employed in the respective storage nodes 104, 106 in association with ports configured as a PCIe non-transparent bridge (NTB), which is illustratively depicted in FIG. 1 as a data path 105. As such, the primary storage node 104 and the secondary storage node 106 can transfer data over the data path 105 by performing posted PCIe write operations. It is noted that the primary and secondary storage nodes 104, 106 can each process and/or perform remote procedure calls (RPC calls) using a low-bandwidth side channel or sideband 107, which is distinct from the high-bandwidth data path 105.

The CPUs and program memories 114, 122 can each include persistent memory (e.g., flash memory, magnetic memory) and/or non-persistent memory (e.g., dynamic random-access memory (DRAM), static random-access memory (SRAM)). Each of the program memories can store a variety of software constructs realized in the form of specialized code and data (e.g., program instructions) that can be executed by the respective CPUs to carry out the techniques and/or methods disclosed herein. The CPUs can execute the specialized code/data as program instructions out of the respective memories to process storage IO requests (e.g., write IO requests, read IO requests) issued by one or more of the host computers 102.1, . . . , 102.n, and to store user data and/or metadata on the storage drive arrays 110, 112 within the data storage environment 100, such as a clustered RAID environment. The CPUs can also execute the specialized code/data as program instructions out of the respective memories to process and/or perform PCIe write operations requested by high-level applications running on the primary and/or secondary storage nodes 104, 106 and/or one or more of the host computers 102.1, . . . , 102.n.

The RAM 118 and the RAM 126 can each be configured to implement memory address windows (also referred to herein as the "NTB memory window(s)") mapped for use with the PCIe NTB. During processing of a PCIe write operation, the DMA engines 116, 124 can be configured, in association with the NTB chips 120, 128, to asynchronously move, copy, or otherwise transfer data over the PCIe NTB (i.e., over the data path 105) between the NTB memory windows of the respective RAMs 118, 126. In certain implementations, the CPUs of the primary and secondary storage nodes 104, 106 can be configured, in association with the NTB chips 120, 128, to process and/or perform PCIe write operations without the aid of a DMA engine. Accordingly, the DMA engine(s) 116 and the DMA engine(s) 124 of the primary storage node 104 and the secondary storage node 106, respectively, are deemed to be optional.

In the context of the CPUs executing specialized code/data as program instructions out of the respective program memories (specified at reference numerals 114, 122; see FIG. 1), a computer program product can be configured to deliver all or a portion of the specialized code/data to the respective CPUs. Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques and/or methods disclosed herein.

During operation, an ordered transfer of a source data buffer can be initiated over the PCIe NTB (i.e., over the data path 105) from the primary storage node 104 to the secondary storage node 106. Having initiated the ordered transfer, the primary storage node 104 can write, over the data path 105, a unique "transfer ID value" for the ordered transfer to a "received transfer ID register" of the secondary storage node 106, as well as make a remote procedure call (RPC call) to send, over the side channel 107, the transfer ID value as a "sent transfer ID value" to the secondary storage node 106. The secondary storage node 106 can process the RPC call to verify the value contained in the received transfer ID register against the sent transfer ID value. Having performed the verification, the secondary storage node 106 can determine a successful or unsuccessful status of the ordered transfer, and send an RPC reply to acknowledge or inform the primary storage node 104 of the successful or unsuccessful status. Because the primary storage node 104 does not wait for completion of the ordered transfer of the source data buffer to the secondary storage node 106, latency is reduced.

Figure 2A:
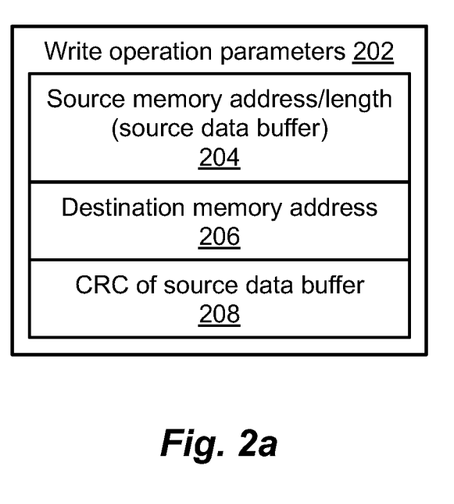
FIG. 2a illustrates several parameters that can be included in a first write operation for initiating an ordered transfer of a source data buffer from a primary storage node to a secondary storage node over an NTB in the highly available storage system of FIG. 1.
Figure 2B:
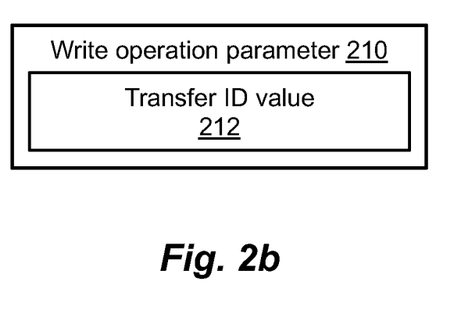
FIG. 2b illustrates a parameter that can be included in a second write operation from the primary storage node to the secondary storage node over the NTB in the highly available storage system of FIG. 1.

The disclosed techniques for providing an efficient NTB-based data transport in a highly available storage system will be further understood with reference to the following illustrative example, and FIGS. 1, 2a, and 2b. In this example, the RAM 118 (see FIG. 1) of the primary storage node 104 and the RAM 126 (see also FIG. 1) of the secondary storage node 106 each have an NTB memory window mapped for use with the PCIe NTB. Further, the secondary storage node 106 includes a remote procedure call handler (RPC handler) (not shown) for processing an RPC call made by the primary storage node 104.

In addition, in this example, it is assumed that a high-level application running on the primary storage node 104 submits a series of requests for write operations to be processed and/or performed by the same channel on the primary storage node 104. As employed herein, the term "channel" can refer to a CPU, a DMA engine, and/or any other suitable hardware and/or software configured to provide functionality for transferring data over the PCIe NTB (i.e., over the data path 105) between the NTB memory windows of the respective RAMs 118, 126. Such a channel has write access to the NTB memory window mapped to the PCIe NTB. In this example, one of the DMA engines 116 of the primary storage node 104 is selected as a channel (also referred to herein as the "DMA channel" or "selected channel") for making ordered data transfers over the data path 105, in response to a series of requests for PCIe write operations submitted by the high-level application. In certain implementations, more than one of the DMA engines 116 can be selected as channels on the primary storage node 104 for concurrent operation.

In this example, the high-level application running on the primary storage node 104 submits a request to perform a first PCIe write operation (i.e., the "first write operation") to the selected channel of the primary storage node 104. The DMA channel maintains a local register (e.g., 64-bit register) for a transfer identifier (ID) value (also referred to herein as the "transfer ID register"), which can be used to track a series of ordered data transfers initiated with the selected channel. It is noted that the transfer ID register maintained by the selected channel is not mapped to the PCIe NTB.

FIG. 2a depicts several write operation parameters 202 of the first write operation, namely, a source memory address and length 204 (also referred to herein as the "source data buffer"), a destination memory address 206, and a cyclic redundancy code (CRC) of the source data buffer 208. The source data buffer 204 corresponds to data contained in the NTB memory window of the RAM 118 included in the primary storage node 104, and the destination memory address 206 corresponds to an offset in the NTB memory window of the RAM 126 included in the secondary storage node 106. The secondary storage node 106 maintains a local register (e.g., 64-bit register) for a received transfer ID value (also referred to herein as the "received transfer ID register"), which, like the transfer ID value maintained at the primary storage node 104, can be used to track the series of ordered data transfers initiated with the selected channel. It is noted that the received transfer ID register maintained at the secondary storage node 106 is mapped to the PCIe NTB. It is further noted that the selected channel of the primary storage node 104 has an associated ID, which is referred to herein as the "channel ID" (specified at reference numeral 220; see FIG. 2c).

Once submitted to the selected channel of the primary storage node 104, the first write operation is queued in an orderly fashion (such as in a ring buffer) for processing of the transfer of the source data buffer (specified at reference numeral 204; see FIG. 2a) to a location designated by the destination memory address (specified at reference numeral 206; see FIG. 2a). For example, the selected channel can issue a memory access command to write to the source data buffer. Further, the NTB chip 120 of the primary storage node 104 can translate the memory access command to a PCIe packet and transfer the PCIe packet over the data path 105 to the secondary storage node 106. The NTB chip 128 of the secondary storage node 106 can translate the PCIe packet to a write command for writing the source data buffer to the destination memory address. The selected channel also obtains a unique transfer ID value for the ordered data transfer and stores the transfer ID value in its transfer ID register. It is noted that the transfer ID register can store the transfer ID value of the current write operation being processed by the selected channel. Once a subsequent write operation is submitted to the selected channel, the transfer ID value for the subsequent write operation can be obtained by incrementing the value stored in the transfer ID register and storing the incremented value in the transfer ID register.

Without waiting for the transfer of the source data buffer to complete, the high-level application running on the primary storage node 104 submits a request to perform a second PCIe write operation (i.e., the "second write operation") to the selected channel of the primary storage node 104. FIG. 2*b* depicts a write operation parameter 210 of the second write operation, namely, the transfer ID value 212. Like the first write operation, the second write operation is queued in an orderly fashion (such as in a ring buffer) in the selected channel, and, once performed, causes the transfer ID value (specified at reference numeral 212; see FIG. 2*b*) in the transfer ID register of the selected channel to be written to the received transfer ID register of the secondary storage node 106, overwriting any transfer ID value that may have been previously stored in the received transfer ID register.

Figure 2C:
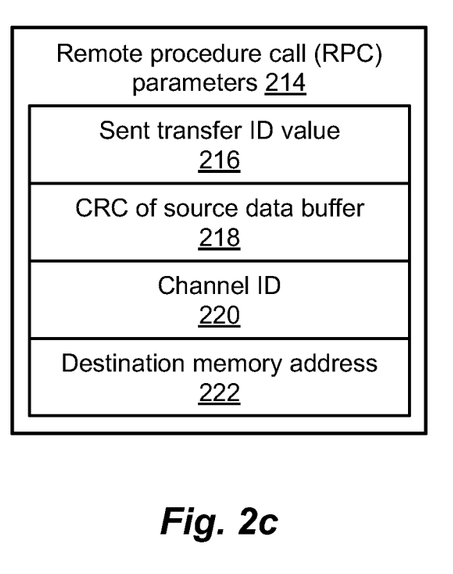
FIG. 2c illustrates several parameters that can be included in a remote procedure call (RPC call) for determining a successful or unsuccessful status of the ordered transfer of the source data buffer from the primary storage node to the secondary storage node over the NTB in the highly available storage system of FIG. 1.

Having performed the second write operation, the selected channel returns the transfer ID value with the designation, "sent transfer ID value" (specified at reference numeral 216; see FIG. 2*c*) to the high-level application running on the primary storage node 104. The primary storage node 104 then makes a remote procedure call (RPC call) over the side channel 107 to the secondary storage node 106. FIG. 2*c* depicts several RPC parameters 214 of the RPC call, namely, the sent transfer ID value 216, a CRC of the source data buffer 218, the channel ID 220, and the destination memory address 222. The primary storage node 104 can, after an interval, receive a reply to the RPC call over the side channel 107 from the secondary storage node 106.

Once the RPC call has been made by the primary storage node 104, the secondary storage node 106 can poll the RPC handler and process the RPC call after a predefined polling period. It is noted that, in situations where usage is high at the secondary storage node 106, the predefined polling period can be longer than the time required to make the ordered transfer of the source data buffer. In such situations, once the RPC call is processed by the secondary storage node 106, the ordered transfer has likely already occurred, and the transfer ID value has likely already been updated at the received transfer ID register.

After the predefined polling period, the secondary storage node 106 processes the RPC call to determine whether the value contained in the received transfer ID register associated with the channel ID (as specified at reference numeral 220) is less than the sent transfer ID value (as specified at reference numeral 216). If the received transfer ID value is determined to be less than the sent transfer ID value, then either (i) the ordered transfer of the source data buffer (as specified at reference numeral 204; see FIG. 2*a*) to the destination memory address (as specified at reference numeral 206; see FIG. 2*a*) has not occurred, or (ii) the ordered data transfer has occurred, but the transfer ID value (as specified at reference numeral 212) has not been written to the received transfer ID register. In this case, the RPC call to the secondary storage node can either enter a holding mode or send an RPC reply over the side channel 107, directing the primary storage node 104 to repeat the desired data transfer. Otherwise, if the received transfer ID value associated with the channel ID is determined to be greater than or equal to the sent transfer ID value, then it can be assumed that the ordered transfer of the source data buffer to the destination memory address has occurred. In this case, the secondary storage node 106 can verify a CRC of the transferred data against the CRC of the source data buffer (as specified at reference numeral 218). If the CRC fails, then the secondary storage node 106 can send an RPC reply over the side channel 107 to inform the primary storage node 104 of the CRC failure. If the CRC succeeds, then the secondary storage node 106 can send an RPC reply over the side channel 107 to acknowledge or inform the primary storage node 104 of the successful completion of the data transfer.

By initiating the ordered transfer of the source data buffer from the primary storage node 104 to the secondary storage node 106 over the PCIe NTB (i.e., the data path 105), writing a unique transfer ID value for the ordered transfer over the data path 105 to a received transfer ID register of the secondary storage node 106, making an RPC call to send, over the side channel 107, the transfer ID value as a sent transfer ID value to the secondary storage node 106, and processing the RPC call to verify the value contained in the received transfer ID register against the sent transfer ID value, the secondary storage node 106 can determine a successful or unsuccessful status of the ordered transfer, and send an RPC reply to acknowledge or inform the primary storage node 104 of the successful or unsuccessful status. Because the primary storage node 104 does not wait for completion of the ordered transfer of the source data buffer to the secondary storage node 106, latency is reduced.

Figure 3:
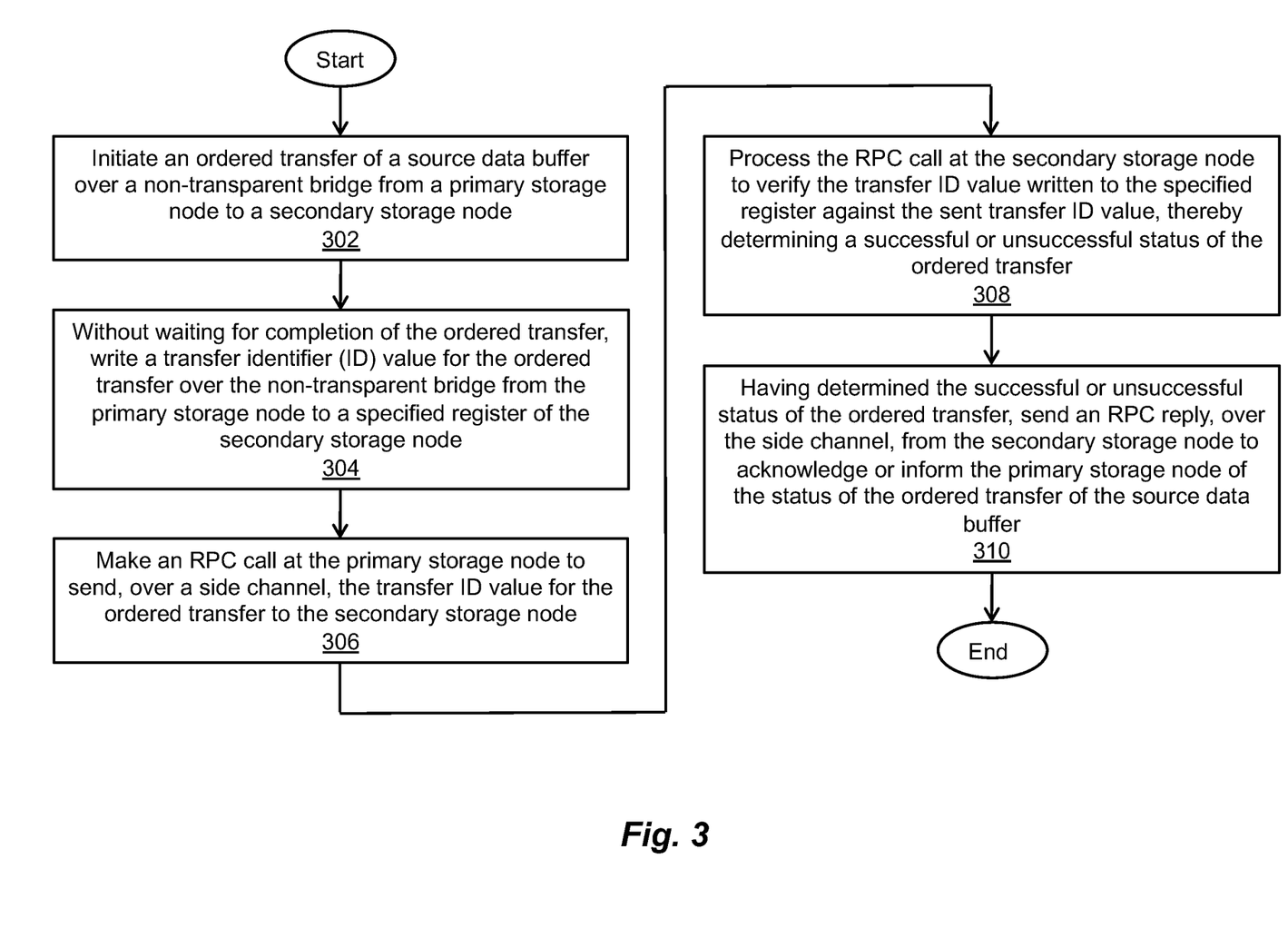
FIG. 3 is a flow diagram of an exemplary method of providing an efficient NTB-based data transport in the highly available storage system of FIG. 1.

An exemplary method of providing an efficient NTB-based data transport in a highly available storage system is described below with reference to FIG. 3. This exemplary method of providing an efficient NTB-based data transport can be performed in a storage system that includes at least a primary storage node and a secondary storage node communicably connected to the primary storage node for high availability. As depicted in block 302, an ordered transfer of a source data buffer is initiated over a non-transparent bridge from the primary storage node to the secondary storage node. As depicted in block 304, without waiting for completion of the ordered transfer, a transfer identifier (ID) value for the ordered transfer is written over the non-transparent bridge from the primary storage node to a specified register of the secondary storage node. As depicted in block 306, an RPC call is made at the primary storage node to send, over a side channel, the transfer ID value for the ordered transfer to the secondary storage node. As depicted in block 308, the RPC call is processed at the secondary storage node to verify the transfer ID value written to the specified register against the sent transfer ID value, thereby determining a successful or unsuccessful status of the ordered transfer. As depicted in block 310, having determined the successful or unsuccessful status of the ordered transfer, an RPC reply is sent, over the side channel, from the secondary storage node to acknowledge or inform the primary storage node of the status of the ordered transfer of the source data buffer.

Having described the above illustrative embodiments, several alternative embodiments and/or variations can be made and/or practiced. For example, it was described herein that the disclosed techniques can be employed to provide an efficient NTB-based data transport in a highly available storage system. In certain alternative embodiments, the disclosed techniques can be employed to provide an efficient data transport in a highly available storage system based on a transparent bridge. Further, in certain alternative embodiments, the disclosed techniques can be employed to provide an efficient data transport in a highly available storage system based on a communication manager interface (CMI) between a pair of CPUs, such as the CPU 114 of the primary storage node 104 and the CPU 122 of the secondary storage node 106 (see FIG. 1).

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a file system, object storage, a virtualized device, a logical unit (LU), a logical unit number (LUN), a logical volume, a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by address. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or simply "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of providing an efficient non-transparent bridge-based data transport in a highly available storage system, the method comprising:
   initiating an ordered transfer of a source data buffer over a non-transparent bridge (NTB) from a first storage node to a second storage node in the highly available storage system;
   without waiting for completion of the ordered transfer, writing a transfer identifier (ID) value for the ordered transfer over the NTB from the first storage node to a specified register of the second storage node;
   making a remote procedure call (RPC call) at the first storage node to send, over a side channel, the transfer ID value for the ordered transfer to the second storage node;
   processing the RPC call at the second storage node to verify the transfer ID value written to the specified register against the sent transfer ID value, thereby determining a status of the ordered transfer; and
   having determined the status of the ordered transfer, sending an RPC reply, over the side channel, from the second storage node to acknowledge or inform the primary storage node of the status of the ordered transfer of the source data buffer.

2. The method of claim 1 wherein the transfer ID value is one of a series of transfer ID values written to the specified register of the second storage node, and wherein the writing of the transfer ID value includes overwriting a transfer ID value previously written to the specified register of the second storage node.

3. The method of claim 2 further comprising:
   obtaining the transfer ID value for the ordered transfer by incrementing the transfer ID value previously written to the specified register of the second storage node.

4. The method of claim 1 wherein the initiating of the ordered transfer of the source data buffer includes initiating a first PCIe write operation, and wherein the first PCIe write operation has a plurality of parameters including at least a memory address and length of the source data buffer and a destination memory address.

5. The method of claim 4 wherein the memory address and length of the source data buffer corresponds to a first NTB memory window in a first memory of the first storage node, wherein the destination memory address corresponds to a second NTB memory window in a second memory of the second storage node, and wherein the method further comprises:
   performing the first PCIe write operation by asynchronously transferring the source data buffer over the NTB from the first NTB memory window to the second NTB memory window.

6. The method of claim 4 wherein the writing of the transfer ID value for the ordered transfer includes initiating a second PCIe write operation, wherein the second PCIe write operation has at least one parameter including the transfer ID value.

7. The method of claim 6 wherein the specified register of the second storage node is mapped to the NTB, and wherein the method further comprises:

performing the second PCIe write operation by asynchronously sending the transfer ID value over the NTB to the specified register of the second storage node.

8. The method of claim 1 wherein the processing of the RPC call at the second storage node includes processing the RPC call after a predefined polling period.

9. The method of claim 1 wherein the processing of the RPC call at the second storage node includes determining whether the transfer ID value contained in the specified register of the second storage node is less than, greater than, or equal to the sent transfer ID value.

10. The method of claim 9 wherein the processing of the RPC call at the second storage node further includes, if the transfer ID value contained in the specified register of the second storage node is less than the sent transfer ID value, performing one or more of (i) entering a holding mode, and (ii) sending an RPC reply over the side channel directing the first storage node to repeat the ordered transfer.

11. The method of claim 9 wherein the processing of the RPC call at the second storage node further includes, if the transfer ID value contained in the specified register of the second storage node is greater than or equal to the sent transfer ID value, determining that the ordered transfer of the source data buffer has been completed.

12. The method of claim 11 further comprising:

sending, over the side channel, an RPC reply to the first storage node to acknowledge completion of the ordered transfer of the source data buffer.

13. The method of claim 1 wherein the RPC call has at least one parameter including the cyclic redundancy code (CRC) of the source data buffer, and wherein the method further comprises:

verifying a CRC of the source data buffer transferred to the second storage node against the CRC of the source data buffer provided as a parameter of the RPC call.

14. A highly available storage system, comprising:
a primary storage processor; and
a secondary storage processor,
wherein the primary storage processor is communicably connected over a non-transparent bridge (NTB) to the secondary storage processor,
wherein the primary storage processor is configured to:
initiate an ordered transfer of a source data buffer over the NTB to the secondary storage processor;
without waiting for completion of the ordered transfer, write a transfer identifier (ID) value for the ordered transfer over the NTB to a specified register of the secondary storage processor; and
make a remote procedure call (RPC call) to send, over a side channel, the transfer ID value for the ordered transfer to the secondary storage processor, and wherein the secondary storage processor is configured to:
process the RPC call to verify the transfer ID value written to the specified register against the sent transfer ID value, thereby determining a status of the ordered transfer; and
having determined the status of the ordered transfer, send an RPC reply, over the side channel, to acknowledge or inform the primary storage processor of the status of the ordered transfer of the source data buffer.

15. The storage system of claim 14 wherein the secondary storage processor is further configured to determine whether the transfer ID value contained in the specified register of the secondary storage node is less than, greater than, or equal to the sent transfer ID value.

16. The storage system of claim 15 wherein the secondary storage processor is further configured, if the transfer ID value contained in the specified register of the secondary storage node is less than the sent transfer ID value, to perform one or more of (i) entering a holding mode, and (ii) sending an RPC reply over the side channel directing the first storage node to repeat the ordered transfer.

17. The storage system of claim 15 wherein the secondary storage processor is further configured, if the transfer ID value contained in the specified register of the secondary storage node is greater than or equal to the sent transfer ID value, to determine that the ordered transfer of the source data buffer has been completed.

18. The storage system of claim 17 wherein the secondary storage processor is further configured to send, over the side channel, an RPC reply to the first storage node to acknowledge completion of the ordered transfer of the source data buffer.

19. A computer program product including a set of non-transitory, computer-readable media having instructions that, when executed by processing circuitry of a first storage node and a second storage node communicably connected to one another over a non-transparent bridge (NTB) in a highly available storage system, cause the processing circuitry to perform a method comprising:

initiating an ordered transfer of a source data buffer over the NTB from the first storage node to the second storage node;

without waiting for completion of the ordered transfer, writing a transfer identifier (ID) value for the ordered transfer over the NTB from the first storage node to a specified register of the second storage node;

making a remote procedure call (RPC call) at the first storage node to send, over a side channel, the transfer ID value for the ordered transfer to the second storage node;

processing the RPC call at the second storage node to verify the transfer ID value written to the specified register against the sent transfer ID value, thereby determining a status of the ordered transfer; and having determined the status of the ordered transfer, sending an RPC reply, over the side channel, from the second storage node to acknowledge or inform the primary storage node of the status of the ordered transfer of the source data buffer.

20. The computer program product of claim 19 wherein the transfer ID value is one of a series of transfer ID values written to the specified register of the second storage node, wherein the writing of the transfer ID value includes overwriting a transfer ID value previously written to the specified register of the second storage node, and wherein the method further comprises:

obtaining the transfer ID value for the ordered transfer by incrementing the transfer ID value previously written to the specified register of the second storage node.

* * * * *